(No Model.) 6 Sheets—Sheet 1.

V. WITTE.
BUTTONHOLE SEWING MACHINE.

No. 549,697. Patented Nov. 12, 1895.

(No Model.) 6 Sheets—Sheet 3.

V. WITTE.
BUTTONHOLE SEWING MACHINE.

No. 549,697. Patented Nov. 12, 1895.

Witnesses
Chas. H. Smith
Harold Serrell

Inventor
Victor Witte
per Lemuel W. Serrell
Atty (No Model.)  6 Sheets—Sheet 5.

V. WITTE.
BUTTONHOLE SEWING MACHINE.

No. 549,697. Patented Nov. 12, 1895.

FIG. 11.

Witnesses
Chas H. Smith
Harold Serrell

Inventor
Victor Witte
Lemuel W. Serrell
Atty (No Model.)

V. WITTE.
BUTTONHOLE SEWING MACHINE.

No. 549,697.　　　　　　　　　Patented Nov. 12, 1895.

UNITED STATES PATENT OFFICE.

VICTOR WITTE, OF LONDON, ENGLAND.

BUTTONHOLE SEWING-MACHINE.

SPECIFICATION forming part of Letters Patent No. 549,697, dated November 12, 1895.

Application filed August 31, 1894. Serial No. 521,797. (No model.) Patented in England August 23, 1893, No. 15,959.

*To all whom it may concern:*

Be it known that I, VICTOR WITTE, a subject of the German Emperor, residing at Newgate Street, in the city of London, England, have invented certain new and useful Improvements in Buttonhole Sewing-Machines, (for which a patent has been granted me in Great Britain, dated August 23, 1893, No. 15,959,) of which the following is a specification.

This invention refers to improvements in machines for cutting and sewing pear-shaped buttonholes and forming the terminal fastening known as a "bar-lock" stitch—that is, a number of stitches across the narrow end of the buttonhole. The material in which such a buttonhole is to be formed is placed in and held by a work-clamp while the hole is cut by a mechanical cutting device of improved construction, the work-holding clamp being adapted by my improvements to give a parallel opening or expansion to the cut hole, and the said clamp then carries and guides the material, as is usual in such machines, while being operated upon by the stitch devices. By my improvements, as hereinafter described, I adapt this class of pear-shaped-buttonhole sewing-machine to produce either a lock or a locked-chain stitch with two threads or an ordinary chain-stitch with one thread, and after stitching around the edges of the buttonhole the machine may be caused to produce a lock-stitch for the formation of the bar-lock, all as hereinafter fully explained with reference to the accompanying drawings.

Figs. 3 to 10 are detail views of portions of same hereinafter referred to; and Figs. 11, 12, and 13 are respectively plan of clamp mechanism with the work-plate removed, top plan of the work-plate, and clamp device and elevation of clamp device on a larger scale than Fig. 12.

Figure 1:
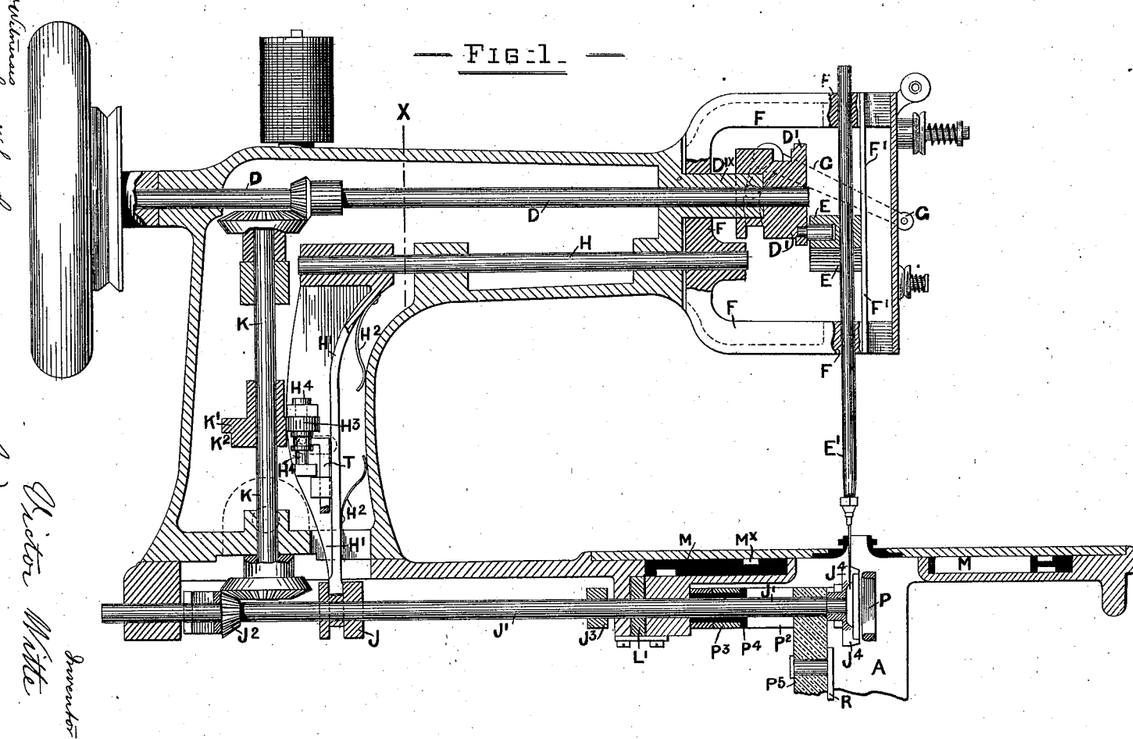
Figure 1 is a vertical section, and Fig. 2 an inverted plan, showing such a machine constructed with my aforesaid improvements.
Figure 2:
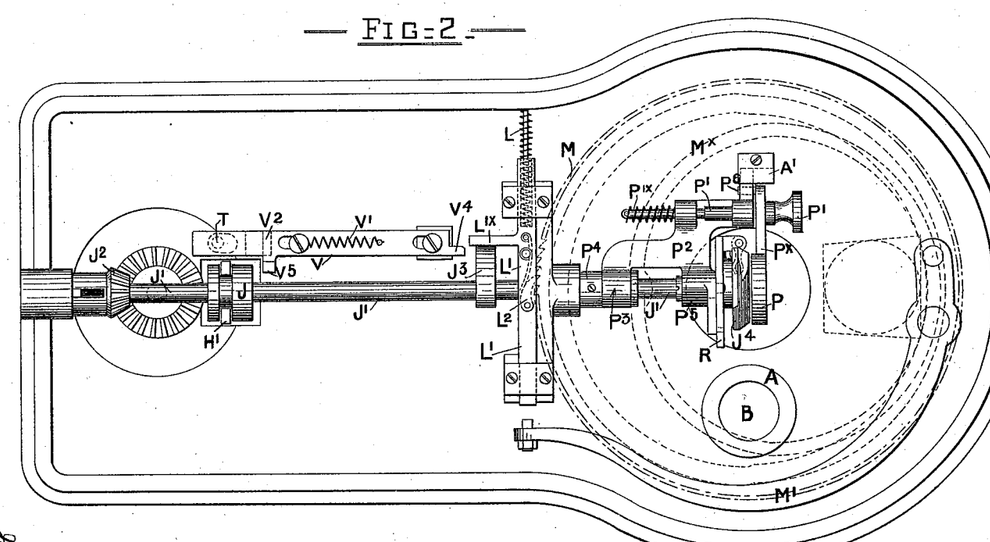
Figures 3, 4, 5, 10:
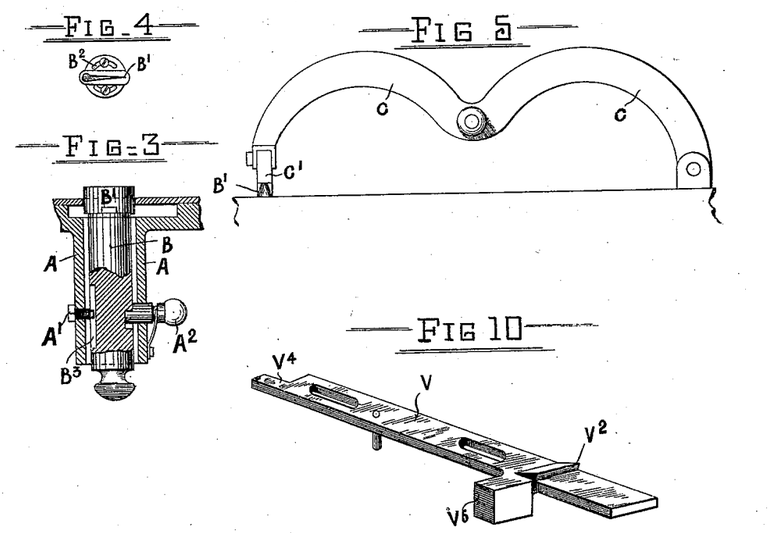

According to this invention the bed-plate of the machine is provided, as usual in such machines, with a vertical tube-bearing, as at A, Figs. 1 and 2, in which bearing is located a vertical bolt B, as shown in sectional elevation at Fig. 3, carrying a cutter B', a top plan of which is shown at Fig. 4. The cutter is mounted upon the bolt B in an improved manner by means of lugs $B^2$, formed thereon, and screws passing through segmental slots therein into the upper end of the cutter-bolt B, whereby the position of the cutter may be adjusted upon the bolt and centralized with the stitch mechanism without difficulty. The throw of the bolt B is limited by a set-pin A' in the vertical tube A taking into a lengthwise groove $B^3$ in the bolt B, it being retained in its upward-acting position by a spring-actuated pin $A^2$ in the tube A taking into a notch in the bolt, and when not required for use the pin $A^2$ is withdrawn and the bolt is lowered by gravity. The ordinary lever-arm C (not shown at Figs. 1 and 2, but separately illustrated in elevation at Fig. 5) is pivoted on the upper face of the base-plate, as usual in this class of machine, and carries a striking-block C', between which latter and the cutter B' the buttonhole is formed in the material.

Upon the end of the main driving-shaft D, Fig. 1, passing through the gooseneck or arm of the machine, is fitted a disk D, a crank-pin or roller carried thereby taking into a slotted cam-block E, secured to the needle-bar E, to vertically reciprocate the latter, the needle-bar E' being mounted, according to my invention, in a frame F, Fig. 1, adapted to be given a to-and-fro motion in the head of the machine, the said frame F having a vertical front plate F', against which the block E bears.

Figures 6, 7, 8:
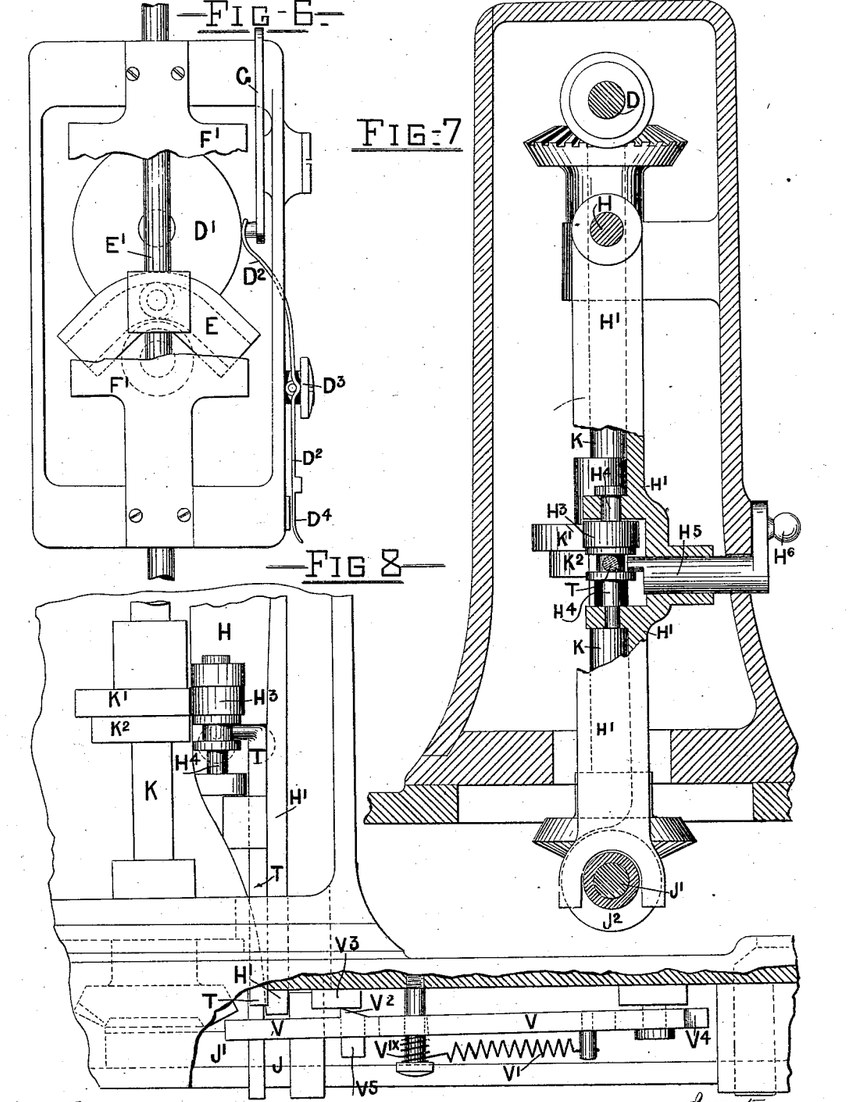

Fig. 6 is a sectional end elevation of the head of the machine on an enlarged scale, the front plate F' being broken away to show the slotted cam-block E, the said plate F' coming against same and preventing any rotary motion being communicated to the needle-bar.

$D^2$ is a spring-arm bearing at its upper end on the periphery of the cam-shaped disk D', it being pivoted at $D^3$ to a fixed part of the head and formed at its lower end with a part $D^4$, calculated to stop the supply of needle-thread at proper times by clipping it between the part $D^4$ and the head casting of the machine. G is a thread take-up pivoted to the fixed framework or head of the machine and operated by a cam-groove in the rear part of the cam-disk D'.

In the rear part of the frame F, Fig. 1, is formed an aperture to admit the slide-bearing $D'^\times$ of the shaft D, and below this the said frame is fixed to the end of a sliding bar H, having attached at its rear end a bracket-arm H′, depending downwardly through the standard of the machine, its lower end entering between two fixed collars or in the circular groove of a collar J, Figs. 1 and 2, fixed on the looper-shaft J′, which is adapted to slide endwise in its bearings, as usual in such machines.

H² are springs which tend to retain the bracket-arm H′, and consequently the needle-bar and looper-shaft, in their back positions, as shown at Fig. 1.

Rotary motion is communicated from the main shaft D to the looper-shaft J′ through the medium of a vertical counter-shaft K and suitable bevel-gearing, as usual in this class of machine, the bevel-pinion J² on the looper-shaft being mounted with a feather to allow for the lateral motions to the looper-shaft, and according to my improvements I mount upon the counter-shaft K a collar having upper and lower cam-surfaces K′ K², one or other of which is adapted to act upon a roller H³, loosely mounted upon a pin H⁴, carried by lugs projecting from the bracket-arm H′, to give to the latter arm, and consequently to the looper-shaft J′ and needle-bar E′, a forward traverse against the backward action of the springs H² aforesaid. This part of the mechanism is further illustrated by the enlarged detail views at Figs. 7 and 8, Fig. 7 being a sectional end elevation looking from the right-hand side about the line X, Fig. 1, and Fig. 8 being a sectional front elevation on the same scale, and it will be seen that the roller H³ is formed with a flanged collar and is capable of vertical motion on its pin H⁴ between the brackets on the arm H′. At Fig. 7 this part of the arm H′ is shown in section, it being formed with a bearing to carry a pin H⁵, extending through a lengthwise slot in the standard of the machine (indicated by dotted lines, Figs. 1 and 8) to allow for the to-and-fro motion of the pin H⁵, the latter having an external handle H⁶, whereby the pin may be rotated when required. The pin H⁵ is formed with an eccentric-stud taking into the groove of the roller H³, so that by turning the pin H⁵ by the handle H⁶ the roller is shifted from the cam K′ to cam K², or vice versa, the cam K² giving the proper side motions to the stitch devices when sewing the edges of the buttonholes and the cam K′ an increased side motion for forming the finishing stitch or bar-lock, as hereinafter described.

Upon the looper-shaft J′, Figs. 1 and 2, is mounted a feed-motion cam J³, which, in conjunction with a return-spring L, reciprocates a slide L′, carrying a spring-pawl L² to take into and give a step-by-step motion to a feed-operating ratchet-disk M, hereinafter referred to, located below the work-plate.

When forming or producing the final or bar-lock stitch, it is necessary that the action of the feed devices should be arrested and also that the lateral reciprocations of the stitch mechanisms should be increased, and these two changes in the action of the feed and stitch devices I effect by the one movement of the handle H⁶, by which latter the cam-bowl is shifted from the cam K² to the cam K′, whereby the arm H′ and the parts in connection therewith receive an increased lateral throw, and also a sliding bolt T, Figs. 1 and 8, carried in bearings on the arm H′, is raised, by reason of its upper bent end being located in a circular groove formed in an extension of the roller H³, whereby any vertical motion of the said roller H³ is communicated to the bolt T. Beneath the base-plate is a catch-bar V, held by two screws passing through slots to allow of the catch-bar being slid, and the catch-bar is provided with a spring V′ to normally retain it in the backward position shown at Figs. 2 and 8, the said catch-bar being shown detached and in perspective at Fig. 10.

V² is a catch on the upper face of the catch-bar V to coact with a fixed projection V³ on the under side of the base-plate.

V′ˣ is a spring tending to force the catch-bar V upward toward the base-plate.

V⁴ is a front projection, and V⁵, Figs. 2 and 10, a side lug.

When the roller H³, and consequently the bolt T, is raised, as at Fig. 8, to produce the aforesaid increased lateral motion, the collar J comes against the lug V⁵, carrying forward the catch-bar V until its catch V² passes the fixed projection V³ and the spring V′ˣ causes the catch V² to take against the said projection V³ and the catch-bolt V is retained in its forward position, whereby the front projection V⁴ is brought into the path of a part L′ˣ, Fig. 2, of the feed-action slide L′ and holds the latter out of action, and the feed devices are not operated. When the roller H³ is lowered, the feed devices are again brought into action by reason of the lower end of the bolt T depressing the rear of the catch-bar V and releasing the catch V² from the projection V³, while the spring V′ removes the end V⁴ of the catch-bar from the path of the feed-action slide L′.

Upon the end of the looper-shaft J′ is mounted a rotary looper J⁴, having a hook and recessed centrally to receive an ordinary circular bobbin-case containing the spool of the under thread. This bobbin-case (not shown in the drawings) is capable of removal, it being held in the recess of the looper by a ring P. Now, as the looper J⁴ and its shaft J′ are laterally reciprocated to accord with the needle movement, it follows that the said adjustable ring P must correspond with this movement, and therefore the ring P is carried by an arm Pˣ, mounted on a spindle P′, the latter being located in bearings on a sliding block P², Fig. 2, mounted in guides A″, below the base-plate of the machine, and the block P² is slid (in accordance with the shaft J′) by a yoke P³ on the block taking between the flanges of a collar P⁴, fixed on the looper-shaft. The ring P thus acquires exactly the same lateral movement as the looper-shaft. The ring-spindle P' is provided with a spring P'$^\times$, which normally retains the ring P adjacent to the looper and holds the bobbin-case. To remove the latter the knob of the shaft P' is pulled by the operator, the spring P'$^\times$ compressed, and the shaft P' partially rotated. The ring P is thus distanced longitudinally from the looper and revolved in a vertical plane entirely away from before the disk of the looper.

P$^6$ is a pin on the arm P$^\times$, and this pin taking into an aperture in the bearing of the shaft P' insures accuracy of position of the ring P.

Figures 9, 9A:
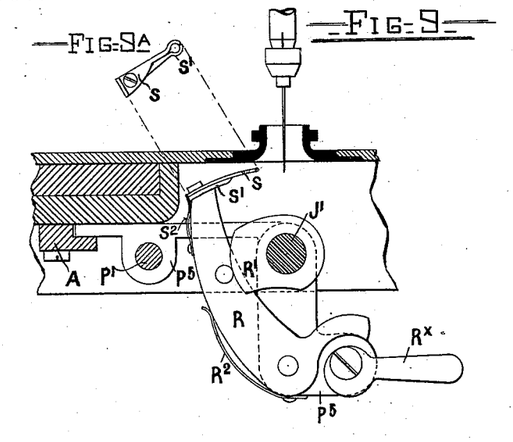

Upon a lower extension P$^5$, Fig. 1, of the reciprocating slide-block P$^2$ is mounted a radial bar R, (clearly shown in the enlarged sectional end view at Fig. 9,) adapted to move at right angles to the slide-block and operated by a cam R' on the looper-shaft J'. This radial bar R carries at its upper extremity an instrument termed by me a "spreader," composed of a jointed or articulated finger S normally held adjacent to a fixed finger S', by a spring S$^2$, and the fingers are at a point in their length bent apart from one another and again closed together at their extremities to form an eye through which the needle is to pass. A plan view of the spreader-fingers S S' is shown at Fig. 9$^A$. The aforesaid cam R', in conjunction with a return-spring R$^2$, Fig. 9, acting on the radial bar gives the spreader proper motions at required times. When forming a chain-stitch or a locked chain-stitch, the duty of the spreader is to receive the loop cast off the rotating hook and to retain and spread same while the needle passes through the bow or eye of the said instrument, and then to cast off the said loop around the needle-thread, the latter retrograde movement of the spreader causing the hinged finger S to open when passing away from the needle. When necessary, the radial bar R, carrying the spreader S S', is held out of action, as is shown at Fig. 9, by an eccentric R$^\times$, having a suitable operating-handle.

Figure 11:
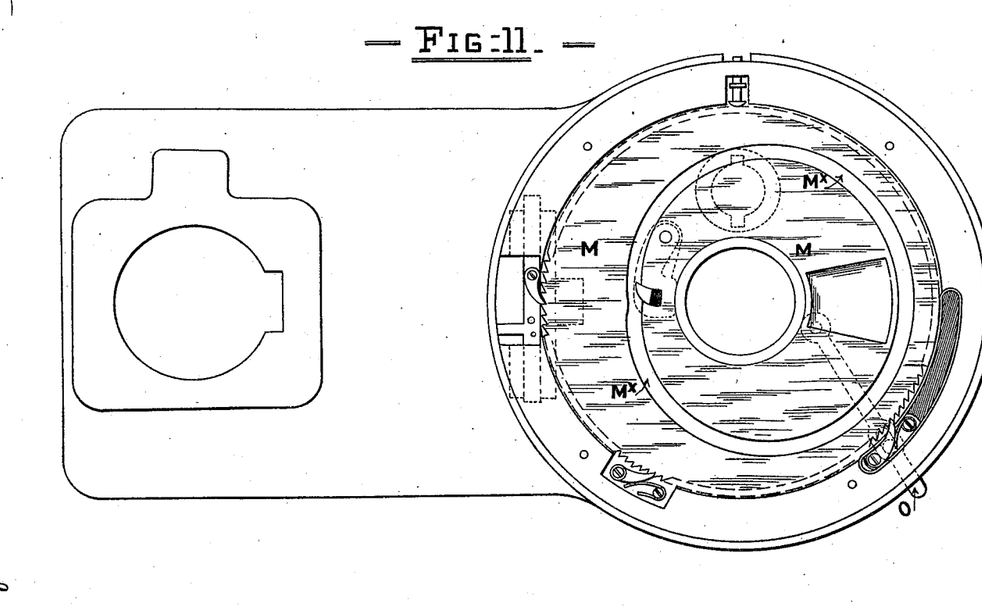
Figure 12:
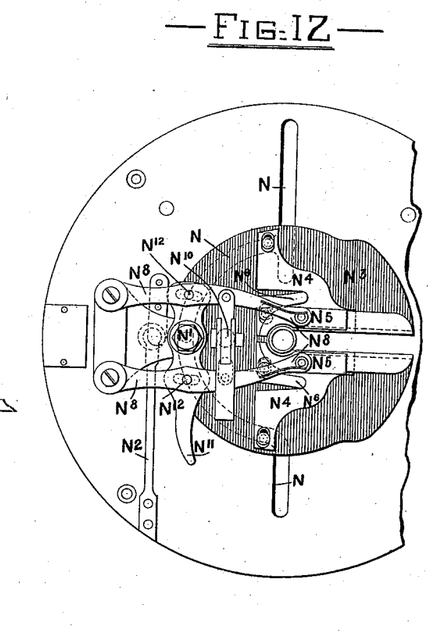
Figure 13:
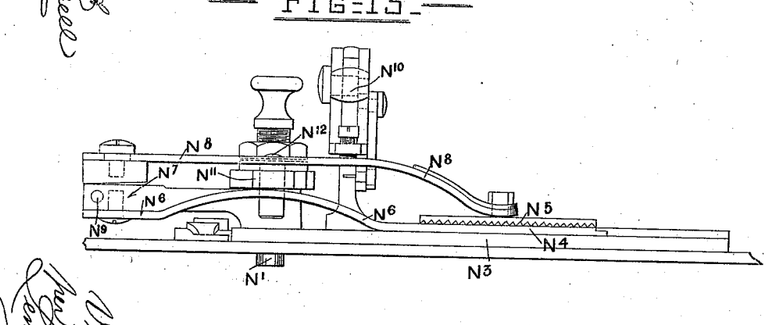

The ratchet-disk M is formed with an upper and an under cam-groove, as is common in machines in this class, wherein the work is carried by a work-clamp above the work-plate, operated by the upper cam-groove M$^\times$ in the disk M, acting in conjunction with slots N, Fig. 12, in the work-plate, this description of feed being illustrated by a plan with the work-plate removed at Fig. 11, a plan of the work-plate and my improved carrier at Fig. 12, and a side elevation of the same carrier on an enlarged scale at Fig. 13. As usual, there is a projecting pin N' in the base of the clamp, guided in the slot N and operated by the said groove M$^\times$ in the disk M.

The work-clamp, Figs. 12 and 13, in which the material is mounted and held is composed, as usual in this class of machinery, of a lower plate N$^3$, having superposed thereon the movable plates N$^4$ N$^4$, upon which the work is laid. These plates N$^4$ N$^4$ are arranged in guides, so that they may be moved horizontally away from each other in opposite directions and are formed with gripping-teeth. It is upon these plates N$^4$ N$^4$, when in their closed positions, that the material in which the buttonhole is to be formed is laid, there being a pair of upper gripping toothed plates N$^5$ N$^5$ to hold the cloth in position. The plates N$^4$ N$^4$ are, in connection with operating-arms N$^6$ N$^6$, centered for horizontal motion in the head N$^7$, while the plates N$^5$ N$^5$ are, in connection with like operating-arms N$^8$ N$^8$, centered for horizontal rotation on a bar, which latter is centered at N$^9$ to allow of the usual lift being given to separate the plates N$^4$ N$^5$.

N$^{10}$ represents an ordinary eccentric device to separate and close the gripping-plates.

N$^{11}$ is a lever pivoted centrally to the fixed head N$^7$, its office being to separate the pairs of gripping-plates one from another horizontally by means of eccentrically-arranged slots in the lever N$^{11}$, acting on pins N$^{12}$, connecting the arms N$^6$N$^8$. After the work has been placed in position and the buttonhole cut the said slit may be opened, and this in a parallel manner, as distinguished from its being opened radially, as heretofore—that is, more at one end than the other.

Upon the top of the work-plate of the machine is a roller carried by a spring-arm N$^2$, to guide the edge of the work-clamp in its travel, and a central projecting throat-plate takes through a slot therein. By these means the work-clamp, being guided by the throat-plate and the guide-roller and operated by the rotating cam-groove M$^\times$, is traversed in a straight line for the needle to act on one side of the buttonhole, turned for the rounded end of the said buttonhole and again traversed reversely in a straight line for the other side to be sewed. As it is necessary to vary the extent of feed-motion as the work-clamp is being turned end for end, I provide the usual stop-lever M', Fig. 2, actuated by the lower cam-groove of the disk M, in order to limit the motion of the feed-pawl slide L' at proper times.

O, Fig. 11, is a lever-arm pivoted to the bed-plate and slotted to receive a slide carrying a pawl to engage the disk M, whereby the operator may rotate the said disk M by hand into its proper starting position.

As has been before stated, machines constructed as herein described are capable of forming three varieties of stitch, and I would have it understood that by my invention I am enabled to employ the combination of any two varieties of such stitches in the sewing of a single buttonhole—that is, first, a combination of locked chain-stitch and lock-stitch; second, chain-stitch and lock-stitch, and, third, locked chain-stitch and chain-stitch. Moreover, in some cases I may employ with advantage the whole three varieties of stitches in sewing a single buttonhole, the sides being sewn with a chain-stitch, the eye of the buttonhole with a locked chain-stitch, and the final bar-lock with a lock-stitch, if required. Now it is well known that a proper and well-formed "purl," such as is suitable for tailoring purposes, can only be best obtained by the use of a chain-stitch, and when such has been employed the final bar, which should be a lock-stitch, has had to be made by hand, whereas by my invention I can sew the buttonhole with either a chain or locked chain and "bar" the buttonhole by a lock-stitch without hand labor by one and the same machine. When the third combination—that is, a chain-stitch and a locked chain-stitch—is employed, the chain-stitch may by my invention be advantageously used to sew the straight part of the buttonhole and the locked chain-stitch for the eye of the same buttonhole, whereby the eye is materially strengthened, while the sewing of the straight part of the buttonhole is not rendered too clumsy or unsightly. To produce the first combination of stitches—i. e., the locked chain for the buttonhole edge and the lock-stitch for the bar—the action is as follows: The cloth having been placed into the work-clamp and the hole cut therein, the clamp is moved into position and the machine set in motion, the feed-disk M, operated by cam $J^3$ and ratchet-slide $L'$, acting in conjunction with other parts to feed and guide the work, the handle $H^6$, Fig. 7, being in a position which will bring the bowl $H^3$ to bear against the cam $K^2$, thus giving proper lateral to-and-fro reciprocations to the needle-bar, looper, and stitch mechanism, the circular bobbin-case to carry the under thread having previously been placed in position in the looper $J^4$ and retained therein by the ring P, Fig. 2, and the arm R, Fig. 9, carrying the articulated spreader, having been left in action, (operated by cam $R'$.) The needle first enters the material, passing through the throat-plate and through the eye of the spreader, Fig. $9^A$, which is immediately withdrawn, its finger opening to allow it to pass from the needle. The loop cast by the needle is taken by the hook around the bobbin-case, when the take-up acts and draws the loop onto the neck of the spreader, the latter having been advanced through the loop of thread while held by the hook of the looper. At this time the cam $K^2$ acts and gives to the needle-bar, looper-shaft, and the stitch devices connected thereto a sidewise motion, and consequently on its next descent the needle passes through the buttonhole, through the spreader-eye, and through the loop of thread upon the neck thereof, the spreader immediately receding and passing away from the needle. The looper hook then takes a fresh loop from the needle, and while doing this the thread-stop $D^4$, Fig. 6, clinches the thread, and consequently the looper-hook in the course of its rotation tightens the previously-caught loop. Thus the locking-thread contained in the bobbin-case is deposited in the loops of the chain-stitch and a purl is formed thereby upon the edge of the buttonhole as the work-clamp guides and submits the material to the action of the stitch devices, as is common in this class of machine. When the buttonhole is sewed, the handle and pin $H^6$ $H^5$, Fig. 7, are operated by the attendant and the bowl $H^3$ shifted to the cam $K'$—that is, into the position shown at Fig. 7—whereby the stitch devices are given an increased lateral throw, while the bolt T is raised and allows the catch-bar V, Fig. 8, to be traversed laterally by the collar J until the catch $V^2$ interlocks with the fixed projection $V^3$ and thus stops the action of the feed, as before explained. The spreader, Figs. 9 and $9^A$, is thrown out of action by the handle $R^X$, and the material, remaining stationary, is sewed by a lock-stitch of increased length transversely and at the end of the buttonhole to form the aforesaid bar-lock.

It will be understood that if the buttonhole is to be sewed with a single-thread chain-stitch the bobbin-case is removed and is again replaced when a locked chain or lock stitch is to be produced. The spreader is only thrown out of action when forming a lock-stitch.

It is to be understood that where one thread only is used a loop of thread from the eye-pointed needle is retained for the needle to pass through in its next downward movement, thus producing the well-known chain-stitch, and by the use of a second thread from the bobbin-case the ordinary locked or shuttle stitch will be produced, and when the looping mechanism of the chain-stitch is used with the shuttle-thread the stitches will be laid together with the ordinary chain-stitch locked by the second or shuttle-thread being passed through the loops of needle-thread.

I claim—

1. In a button hole sewing machine the combination with a vertically reciprocating needle and needle bar, a rotating hook or looper and means for imparting lateral reciprocating movements simultaneously to said parts, of a cam operated loop retaining and spreading instrument, capable of being thrown out of action when required, and devices for holding the bobbin case within the looper disk whereby the bobbin case may be released when impaired, both the loop retaining instrument and the bobbin case holding devices sharing the lateral reciprocating motion of the needle and rotary looper all substantially in the manner and for the purposes herein set forth.

2. In a button hole sewing machine the combination with a vertically reciprocating needle and needle bar, a rotating hook or looper and means for imparting lateral reciprocating movements simultaneously to said parts, a loop retaining and spreading instrument capable of being thrown out of action when required, and devices for holding the bobbin case within the looper disk whereby the bobbin case may be released when required, both the loop retaining instrument and the bobbin case holding devices sharing the lateral reciprocating motions of the needle and looper, of mechanism for simultaneously altering the extent of lateral motion of the operative parts and arresting the action of the feed devices, substantially as set forth.

3. In machines for cutting and sewing button holes the combination, with stitch forming mechanism, of a vertically adjustable bolt B located in a tube A on the frame work, of a cutter B' having lugs with segmental slots therein, and screws passing through the slots to adjustably fix the cutter to the head of the bolt B, a set pin A' in the bearing tube A and a groove $B^3$ in the bolt to limit the throw of the latter, and a spring actuated pin $A^2$ passing through the tube A to a slot in the bolt to automatically lock the bolt when forced into its upper acting position (through the work plate) to co-act with the lever carrying the usual striking block substantially as set forth.

4. In a button hole sewing machine the combination with a vertically reciprocating needle and needle bar, a rotating hook or looper, an under thread mechanism, a main rotary driving shaft D and crank disk D' to vertically reciprocate the needle bar E'; of a sliding frame F in the machine head to carry the needle bar, a horizontally sliding bar H fixed to the frame F and having a downwardly extending bracket arm H', a grooved collar J fixed on the looper shaft J' into which collar J the arm H' takes, to communicate endwise motion to the looper shaft, mechanism for giving changeable lateral throw to the needle bar and looper shaft composed of two adjacent cams K' $K^2$ on a rotating vertical counter shaft having gearing to connect the main shaft with the looper shaft, a vertically movable bowl $H^3$ on the bracket arm H', a pin $H^5$ carried by the bracket arm H' and extending by a slot, through the standard of the machine, and an eccentric stud on the pin $H^5$ taking into a groove on the bowl $H^3$, whereby the bowl may be shifted vertically into contact with either cam K' $K^2$ by rotating the said pin $H^5$ and the produced lateral motions thereby varied, substantially as set forth.

5. In a button hole sewing machine the combination with a vertically reciprocating needle and needle bar, a rotating hook or looper and means for imparting lateral reciprocating movements simultaneously to said parts, of the adjacent cams K' $K^2$ and parts connected therewith for varying the distance of the lateral motions and the devices for stopping the feed action simultaneously with the change of lateral motion, composed of a bar T operated by the change of position of the bowl $H^3$, and a bar V acted upon by the said bar T, and brought into the path of the feed bar L' by the increased lateral travel of the collar J, catch arrangement $V^2$ $V^3$ and return spring V', substantially as and for the purposes set forth.

VICTOR WITTE.

Witnesses:
JOH. H. BIDDLES,
T. F. BARNES.